(12) United States Patent
Smith et al.

(10) Patent No.: US 6,585,816 B1
(45) Date of Patent: Jul. 1, 2003

(54) PHASE CHANGE INKS CONTAINING BORATE ESTERS

(75) Inventors: Thomas W. Smith, Penfield, NY (US); Suresh K. Ahuja, Webster, NY (US)

(73) Assignee: Xerox Corporation, Stamford, CT (US)

( * ) Notice: Subject to any disclaimer, the term of this patent is extended or adjusted under 35 U.S.C. 154(b) by 75 days.

(21) Appl. No.: 10/040,464

(22) Filed: Nov. 9, 2001

(51) Int. Cl.$^7$ ................................................ C09D 11/00
(52) U.S. Cl. ................ 106/31.29; 106/31.61; 106/31.58; 106/31.86
(58) Field of Search .................. 106/31.29, 31.61, 106/31.58, 31.86

(56) References Cited

U.S. PATENT DOCUMENTS

| | | | |
|---|---|---|---|
| 3,625,899 A | 12/1971 | Sawyer et al. | 252/75 |
| 3,653,932 A | 4/1972 | Berry et al. | 106/22 |
| 4,192,759 A | 3/1980 | Hamanaka | 252/78.1 |
| 4,303,445 A | 12/1981 | Whitfield et al. | 106/22 |
| 4,390,369 A | 6/1983 | Merritt et al. | 106/31 |
| 4,659,383 A | 4/1987 | Lin et al. | 106/27 |
| 4,745,419 A | 5/1988 | Quate et al. | 346/140 R |
| 4,820,346 A | 4/1989 | Nowak | 106/22 |
| 4,830,671 A | 5/1989 | Frihart et al. | 106/27 |
| 4,975,211 A | 12/1990 | Small, Jr. et al. | 252/49.6 |
| 5,006,170 A | 4/1991 | Schwarz et al. | 106/20 |
| 5,122,187 A | 6/1992 | Schwarz et al. | 106/25 |
| 5,151,120 A | 9/1992 | You et al. | 106/27 |
| 5,171,875 A | 12/1992 | Studnicka et al. | 558/296 |
| 5,354,368 A | 10/1994 | Larson, Jr. | 106/22 A |
| 5,541,627 A | 7/1996 | Quate | 347/10 |
| 5,667,568 A | 9/1997 | Sacripante et al. | 106/20 R |
| 5,688,312 A | 11/1997 | Sacripante et al. | 106/31.49 |
| 5,693,128 A | 12/1997 | Sacripante et al. | 106/31.27 |
| 5,700,316 A | 12/1997 | Pontes et al. | 106/31.58 |
| 5,747,554 A | 5/1998 | Sacripante et al. | 523/161 |
| 5,777,023 A | 7/1998 | Pavlin | 524/590 |
| 5,817,169 A | 10/1998 | Sacripante et al. | 106/31.43 |
| 5,844,020 A | 12/1998 | Paine et al. | 523/161 |
| 5,876,492 A | 3/1999 | Malhotra et al. | 106/31.58 |
| 5,902,390 A | 5/1999 | Malhotra et al. | 106/31.58 |
| 5,922,117 A | 7/1999 | Malhotra et al. | 106/31.58 |
| 5,931,995 A | 8/1999 | Malhotra et al. | 106/31.58 |
| 5,932,630 A | 8/1999 | Kovacs et al. | 523/161 |
| 5,948,149 A | 9/1999 | Ito et al. | 106/31.13 |
| 5,952,402 A | 9/1999 | Paine et al. | 523/161 |
| 5,958,119 A | 9/1999 | Malhotra et al. | 106/31.43 |
| 5,989,325 A | 11/1999 | Sacripante et al. | 106/31.27 |
| 6,017,385 A | 1/2000 | Malhotra et al. | 106/31.29 |
| 6,027,555 A | 2/2000 | Malhotra et al. | 106/31.29 |
| 6,045,607 A | 4/2000 | Breton et al. | 106/31.29 |
| 6,059,871 A | 5/2000 | Boils et al. | 106/31.57 |
| 6,066,200 A | 5/2000 | Breton et al. | 106/31.43 |
| 6,071,333 A | 6/2000 | Breton et al. | 106/31.43 |

FOREIGN PATENT DOCUMENTS

| | | |
|---|---|---|
| GB | 1382418 | 1/1975 |
| JP | 57087480 A2 | 5/1982 |
| JP | 11012524 A2 | 1/1999 |
| JP | 2000104000 | 4/2000 |
| PL | 175836 B1 | 2/1999 |

OTHER PUBLICATIONS

J. Yao et al., "Improvement of Hydrolytic Stability of Borate Esters Used as Lubricant Additives," *Journal of the Society of Tribologists and Lubrication Engineers*, Jun. 1995, p. 475.

Y. Junbin et al., "The Hydrolytic Stability of Borates Used as Oil Additives," *Lubrication Science*, 7–4, Jul. 1995, p. 379.

D. Tanner et al., "Boric Acids Esters. I. A General Survey of Aromatic Ligands and the Kinetics and Mechanism of the Formation and Hydrolysis of Boric Acid Esters of Salicylamide, N–Phenylsalicylamide, and Disalicylimide," *J. Am. Chem. Soc.*, 89:26 (1967), Dec.

Copending Application U.S. Ser. No. (not yet assigned;), filed concurrently herewith, entitled "Aqueous Ink Compositions Containing Borate Esters," by Thomas W. Smith and Jin Wu.

*Primary Examiner*—Mark L. Bell
*Assistant Examiner*—Veronica F. Faison
(74) *Attorney, Agent, or Firm*—Judith L. Byorick

(57) ABSTRACT

Disclosed is a phase change ink composition comprising a colorant and an ink vehicle, said ink being a solid at temperatures less than about 50° C., wherein the ink vehicle comprises a borate ester.

20 Claims, No Drawings

PHASE CHANGE INKS CONTAINING BORATE ESTERS

Copending Application U.S. Ser. No. 10/035,55, filed concurrently herewith, entitled "Aqueous Ink Compositions Containing Borate Esters," with the named inventors Thomas W, Smith and Jin Wu, the disclosure of which is totally incorporated herein by reference, discloses an ink composition containing water in an amount of at least about 5 percent by weight and containing water in an amount of no more than about 50 percent by weight, said ink further containing a colorant and a borate ester, wherein either (a) the ink also contains an amine compound, or (b) the borate ester is hydrolytically stable.

BACKGROUND OF THE INVENTION

The present invention is directed to phase change (hot melt) ink compositions. More specifically, the present invention is directed to phase change ink compositions suitable for use in ink jet printing processes, including piezoelectric ink jet printing processes, acoustic ink jet printing processes, and the like. One embodiment of the present invention is directed to a phase change ink composition comprising a colorant and an ink vehicle, said ink being a solid at temperatures less than about 50° C., wherein the ink vehicle comprises a borate ester.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In ink jet printing processes employing these phase change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase change ink is applied to the substrate, freezing on the substrate resolidifies the ink.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate.

The use of phase change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also be attracted by an electric field.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons: esters: phenols; amides; imides; halocarbons: urethanes; ethers; sulfones; sulfamides; sulfonamindes; phosphites; phosphonates: phosphates; alkyl sulfines; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 4,303,445 (Whiffield et al.), the disclosure of which is totally incorporated herein by reference, discloses a process and composition for reducing or eliminating moisture in fluids suitable for use in ink jet systems without significantly changing the surface tension of these fluids. It has been discovered that mixing at least one borate ester derived from an aqueously miscible organic hydroxyl-containing compound, with a substantially non-aqueous printing medium will hygroscopically stabilize the printing medium, (maintain the printing medium substantially water-free) without significantly changing its surface tension.

U.S. Pat. No. 3,625,899 (Sawyer et al.), the disclosure of which is totally incorporated herein by reference, discloses a water-insensitive hydraulic fluid composition comprising from about 54.5 to about 92 percent by weight of at least one borate ester, from 0 to about 20 percent by weight of a polyoxyalkylene glycol, and from about 3 to about 43 percent by weight of a glycol monoether or diether diluent together with minor amounts of an alkaline buffer and an antioxidant, if desired. Such water-insensitive hydraulic fluids are high boiling compositions suitable for use as brake fluids.

U.S. Pat. No. 5,171,875 (Studnicka et al.), the disclosure of which is totally incorporated herein by reference, discloses the composition and application of highly branched borate esters which function as oil phases for use in personal care, textile, and related applications. The properties of these compounds which makes them well suited for these applications is the fact that they are substantive to fibers, hair, and skin, are very mild to the skin and eyes. These materials are surprisingly stable to hydrolysis.

U.S. Pat. 4,192,759 (Hamanaka), the disclosure of which is totally incorporated herein by reference, discloses brake fluids of good quality which increase wet equilibrium reflux boiling point without increasing rubber swelling property and disperse or dissolve homogeneously the additives and metals extracted from rubber brake cups and cylinder pipes which can be obtained by dissolving semipolar borates containing a bond represented by the formula

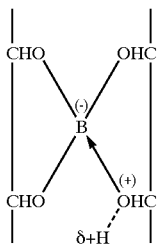

which can be a hybridized orbital between $SP^2$ and $SP^3$ with regard to boron atom and having at least two hydroxyl groups outside said bond and heteroborates comprising an $SP^2$ hybridized orbital and containing butyl group and methyl group in their molecule in polyalkylene glycol monoalkyl ethers comprising a $C_1$ to $C_4$ alkyl group.

U.S. Pat. No. 5,948,149 (Ito et al.), the disclosure of which is totally incorporated herein by reference, discloses a water-based ink composition in which the wettability, surface tension, antibacterial properties, and other properties are controlled based on a simple formulation. The water-based ink composition contains a semi-polar boron compound. Semi-polar boron compounds represented by diglycerin borate exhibit superior wettability in an ordinary environment, and addition of such a compound achieves a water-based ink composition well-balanced in surface tension, wettability, and drying property even if the composition is prepared according to a simple formulation. The optimum quantitative range for addition of the semi-polar boron compound depends on whether the coloring material contained in the watercolor ink composition is a dyestuff or a pigment. When the coloring material is a dyestuff, the quantitative range is preferably 0.5 to 3.0 percent by weight relative to the entire quantity of the water-based ink composition. When the coloring material is a pigment, the quantitative range is preferably 0.05 to 10 percent by weight relative to the same.

U.S. Pat. No. 4,975,211 (Small, Jr. et al.), the disclosure of which is totally incorporated herein by reference, discloses borated alkyl catechols that can be stabilized by the addition of diethylamine. Lubricating oils containing a borated alkyl catecholdiethylamine complex are effective in reducing oxidation, wear, and deposits in an internal combustion engine.

British Patent 1,382,418 (Sawyer et al.), the disclosure of which is totally incorporated herein by reference, discloses low water-sensitive hydraulic fluids containing borate esters and monoethanolamine.

Japanese Patent Publication JP 11012524 A2, the disclosure of which is totally incorporated herein by reference, discloses an aqueous gloss ink composition capable of readily redispersing a pigment and used by filling it in a writing tool or a painting tool such as a marking pen or a paint-brush pen. The ink contains at least 1.0 to 40 weight percent of a pigment containing a pearl pigment and/or a metal powder pigment, 0.1 to 5.0 weight percent of a dispersant containing at least a fatty acid ester of polyoxyethylene diglycerol borate, a resin and water.

Japanese Patent Publication JP 57087480 A2, the disclosure of which is totally incorporated herein by reference, discloses an ink containing a specific organoboronic compound, capable of imparting a high degree of wetting property to the ball of a ball-point pen, and good ink extrusion and transferring property to the surface of a writing paper without the paper slippage phenomenon. The ink is prepared by adding preferably 0.01 to 0.5 weight percent organoboronic compound expressed by the formula

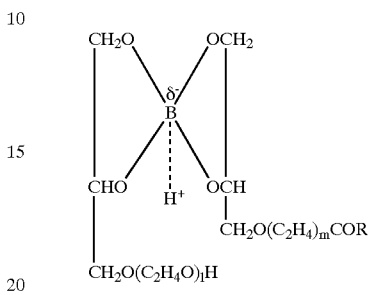

wherein R is a 7 to 21 C alkyl; I and m are integers 1 to 20 respectively, preferably I+m=24 to an aqueous ink composition for a ball-point pen containing a water-soluble dye, preservative, etc. in an aqueous solvent containing water as a principal component and 5 to 20 weight percent water-soluble polyhydric alcohol, e.g. ethylene glycol.

Japanese Patent Publication JP 2000104000, the disclosure of which is totally incorporated herein by reference, discloses glossy aqueous writing inks with drying prevention on pen tips. The inks contain ≦50 percent water, and ≧30 percent water-soluble organic solvents with boiling point of ≧1200. An ink containing Alpaste WXM U 75, a green pigment, Dispant EN 120A (pigment dispersant), 40.8 percent water, and 38.0 percent ethylene glycol showed a pen tip drying prevention of 30 times of that for an ink containing 78.8 percent water without the ethylene glycol.

Polish Patent Publication PL 175836 B1, the disclosure of which is totally incorporated herein by reference, discloses a brake fluid consisting of polyalkoxylated esters of boric acid (especially tris(3,6,9-trioxydecyl)borate) 20–25, an ether mixture (consisting of triethylene glycol methyl ether 50–70, tetraethylene glycol methyl ether 20–40, and higher ethers 5–10%) 35–55, an ether mixture (consisting of diethylene glycol butyl ether 60–70, triethylene glycol butyl ether 20–30, and tetraethylene glycol butyl ether 5–10%) 10–35, a diethylene glycol+triethylene glycol mixture (consisting of diethylene glycol 60–80 and triethylene glycol 20–40%) ≦10, diphenylolpropane ≦0.04, 1-methylene(diethanol) amino-4-methylbenzotriazole ≦0.04, reaction product of dodecenyl succinic anhydride and ethoxylated C18 fatty amine ≦0.08, and tricresylisopropyl phosphate ≦0.4%. The brake fluid is suitable for operation at ≦200°, is resistant to ≦4 weight percent water addition, does not corrode metals, and does not attack rubber.

J. Yao et al., "Improvement of Hydrolytic Stability of Borate Esters Used as Lubricant Additives," *Journal of the Society of Tribologists and Lubrication Engineers*, June 1995, p. 475, and Y. Junbin et al., "The Hydrolytic Stability of Borates Used as Oil Additives," *Lubrication Science* 7–4, July 1995, p. 379, the disclosures of each of which are totally incorporated herein by reference, disclose eleven borate ester compounds that were synthesized and their hydrolytic stabilities compared. The results indicated that the hydrolysis problem of borate esters can be better solved by introducing N,N-dialkylamino-ethyl group with alkyl radicals containing more than three carbon atoms. It is believed that the formation of a stable five-member ring structure in molecules involving coordination of nitrogen with boron substantially contributes to the resistance to hydrolysis of such type compounds.

D. Tanner et al., "Boric Acid Esters. I. A General Survey of Aromatic Ligands and the Kinetics and Mechanism of the Formation and Hydrolysis of Boric Acid Esters of Salicylamide, N-Phenylsalicylamide, and Disalicylimide," J. Am. Chem. Soc., 89:26 (1967), the disclosure of which is totally incorporated herein by reference, discloses a spectrophotometric method developed to detect the presence of boric esters of substituted phenols in aqueous borate buffers. A large series of phenols and related compounds was so examined to evaluate the effects of the number, basicity, and steric bulk of the ligand groups and their geometry upon the stability of resulting boric esters. Quantitative rate constants were measured for the formation of stable boric esters of salicylamide, N-phenylsalicylamide, and disalicylimide under conditions of constant pH and large excess of borate buffer over substrate.

U.S. Pat. No. 3,653,932 (Berry et al.), the disclosure of which is totally incorporated herein by reference, discloses printing with a hot melt type ink comprising coloring material and a vehicle therefor and having a resistivity within the range of about $10^6$ to $10^{11}$ ohm-centimeters and a viscosity within a range having an upper limit of about 50 centipoise when in a liquid phase. To that end, a stream of ink drops are drawn across and deflected in a span between an ink supply and a carrier for impingement thereon. The vehicle of the ink comprises at least one compound which is solid at room temperature and has the general formula

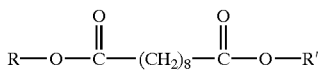

in which each R and R' is an alkyl group containing from 1 to 12 carbon atoms.

U.S. Pat. No. 4,390,369 (Merritt et al.), the disclosure of which is totally incorporated herein by reference, discloses a natural wax-containing ink jet ink for use in an ink jet apparatus which features good print quality. The ink jet ink is discharged from the ink jet ink apparatus at elevated temperatures above ambient.

U.S. Pat. No. 4,659,383 (Lin et al.), the disclosure of which is totally incorporated herein by reference, discloses a novel hot melt impulse ink jet ink which comprises a $C_{20}$–$C_{24}$ acid or alcohol containing vehicle, preferably behenic acid, and a suitable coloring agent. The preferred ink has a melting point above about 65° C., exhibits very good jettability, good heat stability at a reservoir temperature of 90° C., good material compatibility, and an improved print quality. The preferred ink comprises about 80 percent natural behenic acid, 15 percent of a ketone (such as stearone), 3 percent coloring agent, and 2 percent of a plasticizer intended to improve print quality. The subject inks are jetted at relatively high temperatures (80–90° C.) using impulse ink jet devices. Upon impact with the target substrate the subject inks freeze to produce a high quality print having a smear resistance approximately equal to IBM copy, and cracking resistance better than such copy.

U.S. Pat. No. 4,820,346 (Nowak), the disclosure of which is totally incorporated herein by reference, discloses a hot-melt ink for an ink jet printer formed from a solid organic solvent having a melting point less than 150° C. and a low molecular weight thermosetting resin having a high hydroxyl number, together with a dye. The ink has excellent jetting characteristics, forms a hard, stable print raised above the surface of the substrate, provides high dot resolution, and remains colorfast both in the ink jet printer and on the paper, even when exposed to continued high temperatures. It is non-toxic and odorless, and eminently suitable for office document preparation and other applications. In a preferred embodiment, the inks comprise color subtractive dyes, making them suitable for use in multi-color printing.

U.S. Pat. No. 4,830,671 (Frihart et al.), the disclosure of which is totally incorporated herein by reference, discloses an ink composition having the properties of stability and uniformity of performance under ink jet printing conditions and desired printing properties that can be obtained with hot melt ink compositions consisting of a resinous binder comprising a compound of the formula

wherein $R_1$ represents a polymerized fatty acid residue with two carboxylic acid groups removed, $R_2$ and $R_3$ are the same or different and each represent an alkylene with up to 12 carbon atoms, a cycloalkylene with 6 to 12 carbon atoms, an arylene with 6 to 12 carbon atoms, or an alkarylene with 7 to 12 carbon atoms, and $R_4$ and $R_5$ are the same or different and each represents an alkyl having up to 36 carbon atoms, a cycloalkyl having up to 36 carbon atoms, an aryl having up to 36 carbon atoms, or an alkaryl having up to 36 carbon atoms, said resinous binder having a melt viscosity of less than 250 CPS at 50° C. and a colorant distributed through the resinous binder in an effective amount sufficient to impart a predetermined color to the resulting hot melt ink composition.

U.S. Pat. No. 5,151,120 (You et al.), the disclosure of which is totally incorporated herein by reference, discloses an ink jet composition including an organic carrier that is solid at 25° C. and liquid at the operating temperature of an ink jet nozzle and a driver having a critical pressure greater than 10 atmospheres, the carrier and driver being miscible in liquid phase. The ink jet composition is characterized by a viscosity of less than 15 centipoise at 90° C. and a surface tension of between about 20 to about 25 dynes per centimeter at 90° C. The ink jet compositions disclosed are particularly useful in thermal ink jet printing using thermally induced vapor bubbles to eject ink droplets from the printer and onto a substrate.

U.S. Pat. No. 5,354,368 (Larson, Jr.), the disclosure of which is totally incorporated herein by reference, discloses a hot melt jet ink composition comprising a tall oil resin having a high acid number which exhibits improved adhesion when printed onto substrates.

U.S. Pat. No. 5,777,023 (Pavlin), the disclosure of which is totally incorporated herein by reference, discloses solid compositions containing diamidediurethanes useful as components of hot-melt inks. Diamidiurethanes may be prepared by reaction of a hydroxycarboxylic acid and/or lactone with either (1) monoamine and diisocyanate or (2) diamine and monoisocyanate. Alternatively, the diamidediurethane may be prepared by reacting a non-hydric carboxylic acid and/or anhydride with an hydroxyamine and a diisocyanate. The reactant identity and stoichiometry, as well as the reaction conditions, may be tailored to optimize the formation of diamidediurethane in preference to high molecular weight oligomers. The hot-melt inks may be used in ink jet, flexographic, gravure and intaglio printing.

U.S. Pat. No. 5,700,316 (Pontes et al.), the disclosure of which is totally incorporated herein by reference, discloses an ink composition comprising a colorant and a vehicle of a poly(alkylene oxide)-alkylate (I), a poly(alkylene oxide)-dialkylate (II), a polyoxa-alkanoate ester (III), or a polyoxa-alkanedioate diester (IV), and which ink possesses a viscosity of from about 1 centipoise to about 15 centipoise at a temperature of from about 125° C. to about 165° C., and which vehicle is of the formulas

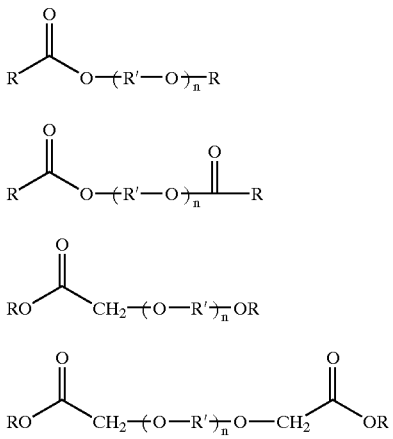

wherein R is alkyl, R' is an alkylene or arylene, and n is an integer of from about 2 to about 20.

U.S. Pat. No. 5,693,128 (Sacripante et al.), the disclosure of which is totally incorporated herein by reference, discloses an ink composition comprising a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,688,312 (Sacripante et al.), the disclosure of which is totally incorporated herein by reference, discloses an ink composition comprising a colorant and an imide or bisimide with a viscosity of from about 1 centipoise to about 10 centipoise at a temperature of from about 125° C. to about 180° C., and which imide or bisimide is of the Formulas I or II, respectively:

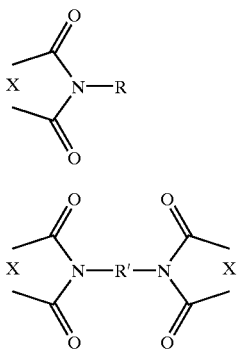

wherein R is a hydrocarbon of from about 2 to about 50 carbon atoms; R' is an alkylene hydrocarbon or a polyalkyleneoxide, each with from about 2 to about 30 carbon atoms; and X is an arylene of from 6 to about 24 carbon atoms, or an alkylene of from about 2 to about 10 carbon atoms.

U.S. Pat. No. 5,667,568 (Sacripante et al.), the disclosure of which is totally incorporated herein by reference, dis-closes an ink composition comprising a colorant and a bisamide with a viscosity of from about 1 centipoise to about 20 centipoise at a temperature of from about 125° C. to about 185° C., and which bisamide is of the formula

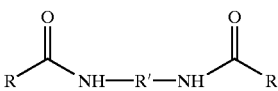

wherein R is an alkyl of from about 2 to about 30 carbon atoms or aryl; R' is an alkylene with from about 2 to about 30 carbon atoms, or R' is a polyalkyleneoxide with from about 2 to about 30 carbon atoms.

U.S. Pat. No. 6,045,607 (Breton et al.), the disclosure of which is totally incorporated herein by reference, discloses an ink composition containing (1) a first solid carbamate, (2) a second carbamate with a dissimilar melting point than the first solid carbamate (1), (3) a lightfastness component, (4) a lightfastness antioxidant, and (5) a colorant.

U.S. Pat. No. 5,876,492 (Malhotra et al.), the disclosure of which is totally incorporated herein by reference, discloses an ink comprising (1) a liquid ester vehicle, (2) a solid ester compound, (3) a liquid crystalline ester compound, (4) a UV absorber, (5) an antioxidant, and (6) a colorant.

U.S. Pat. No. 5,844,020 (Paine et al.), the disclosure of which is totally incorporated herein by reference, discloses an ink composition comprising a colorant and a phase change vehicle derived from the reaction product of a resin containing at least one furan moiety and at least one maleimide moiety, and wherein said ink possesses a viscosity of from about 1 centipoise to about 20 centipoise at a temperature of from about 100° C. to about 180° C.

U.S. Pat. No. 5,817,169 (Sacripante et al.), the disclosure of which is totally incorporated herein by reference, discloses an ink composition comprising a colorant and a vehicle component, and which vehicle component comprises the condensation product of an organic acid and an amino alcohol.

U.S. Pat. No. 5,747,554 (Sacripante et al.), the disclosure of which is totally incorporated herein by reference, discloses an ink composition comprising a polyesterified-dye (I) or polyurethane-dye (II) with a viscosity of from about 3 centipoise to about 20 centipoise at a temperature of from about 125° C. to about 165° C. and represented by the formulas

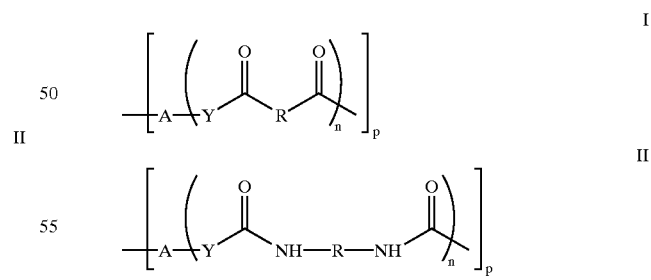

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

U.S. Pat. No. 6,017,385 (Malhotra et al.), the disclosure of which is totally incorporated herein by reference, discloses an ink comprising (1) a liquid aldehyde, a liquid acid, or mixtures thereof, (2) a solid additive aldehyde compound, a solid additive acid compound, or mixtures thereof, (3) a lightfastness UV absorber, (4) a lightfastness antioxidant, and (5) a colorant.

U.S. Pat. No. 5,989,325 (Sacripante), the disclosure of which is totally incorporated herein by reference, discloses a nonaqueous ink composition comprising a vehicle, colorant, and a hydrophobic gelling component.

U.S. Pat. No. 5,958,119 (Malhotra et al.), the disclosure of which is totally incorporated herein by reference, discloses an ink composition comprising (1) a liquid cyclic vehicle (2) a cyclic compound, (3) a liquid crystalline nitrile compound, (4) a lightfastness UV absorber, (5) a lightfastness antioxidant, and (6) a colorant.

U.S. Pat. No. 5,952,402 (Paine et al.), the disclosure of which is totally incorporated herein by reference, discloses an ink composition comprising a colorant and a phase change vehicle derived from the reaction product of a resin containing at least one furan moiety and at least one maleimide moiety, and wherein said ink possesses a viscosity of from about 1 centipoise to about 20 centipoise at a temperature of from about 100° C. to about 180° C.

U.S. Pat. No. 5,932,630 (Kovacs et al.), the disclosure of which is totally incorporated herein by reference, discloses a hot melt ink composition comprising a triblock copolymer vehicle, and a dye or pigment.

U.S. Pat. No. 5,931,995 (Malhotra et al.), the disclosure of which is totally incorporated herein by reference, discloses an ink comprising (1) a liquid aldehyde, a liquid acid, or mixtures thereof, (2) a solid additive aldehyde compound, a solid additive acid compound, or mixtures thereof, (3) a lightfastness UV absorber, (4) a lightfastness antioxidant, and (5) a colorant.

U.S. Pat. No. 5,922,117 (Malhotra et al.), the disclosure of which is totally incorporated herein by reference, discloses an ink composition comprising (1) a liquid alcohol vehicle, (2) a solid alcohol compound, (3) a quaternary compound, (4) a lightfastness UV absorber, (5) a lightfastness antioxidant, and (6) a colorant.

U.S. Pat. No. 5,902,390 (Malhotra et al.), the disclosure of which is totally incorporated herein by reference, discloses an ink comprising (1) a liquid ketone, (2) a solid ketone, (3) a lightfastness UV absorber, (4) a lightfastness antioxidant, and (5) a colorant.

U.S. Pat. No. 6,071,333 (Breton et al.), the disclosure of which is totally incorporated herein by reference, discloses an ink composition containing (1) a solid carbamate compound; (2) an alcohol compound with a melting point of from about 25° C. to about 90° C.; (3) a lightfastness component; (4) a lightfastness antioxidant; and (5) a colorant.

U.S. Pat. No. 6,066,200 (Breton et al.), the disclosure of which is totally incorporated herein by reference, discloses an ink composition comprising (1) a solid urea compound; (2) an alcohol; (3) a lightfastness component; (4) a lightfast antioxidant; and (5) a colorant.

U.S. Pat. No. 6,059,871 (Boils et al.), the disclosure of which is totally incorporated herein by reference, discloses an ink composition comprising a vehicle and a colorant, and wherein the vehicle comprises a mixture of an alkane.

U.S. Pat. No. 6,027,555 (Malhotra et al.), the disclosure of which is totally incorporated herein by reference, discloses an ink composition comprising (1) a liquid cyclic vehicle (2) a cyclic compound, (3) a liquid crystalline nitrile compound, (4) a lightfastness UV absorber, (5) a lightfastness antioxidant, and (6) a colorant.

While known compositions and processes are suitable for their intended purposes, a need remains for improved phase change ink compositions. In addition, a need remains for phase change inks that generate images with reduced or no waxy look and feel. Further, a need remains for phase change inks that bind well to dyes and pigments. Additionally, a need remains for phase change inks that improve printing performance when the ink is jetted from an ink jet printer directly onto a final substrate without the need for an intermediate transfer step. There is also a need for phase change inks with amorphous or limited crystalline characteristics as opposed to crystalline or semicrystalline characteristics. In addition, there is a need for phase change inks of desirably low viscosity at typical ink jet printing temperatures that are also nontacky at room temperature. Further, there is a need for phase change inks with vehicles that are miscible with small molecule semicrystalline diluents that can be added to the ink to adjust the ink viscosity and the temperature at which the ink makes the transition from solid to liquid. Additionally, there is a need for phase change inks with vehicles that are compatible with a wide range of colorants. A need also remains for phase change inks that are solid at ambient temperature and become fluid with minimal increase in temperature or heat input, thus enabling rapid on/off characteristics and reduced energy to maintain the liquid state in phase change ink printers.

SUMMARY OF THE INVENTION

The present invention is directed to a phase change ink composition comprising a colorant and an ink vehicle, said ink being a solid at temperatures less than about 50° C., wherein the ink vehicle comprises a borate ester.

DETAILED DESCRIPTION OF THE INVENTION

The present invention is directed to a phase change ink composition comprising a colorant and an ink vehicle, said ink being a solid at temperatures less than about 50° C., wherein the ink vehicle comprises a borate ester.

Examples of suitable borate esters for the phase change inks of the present invention include those of the general formula

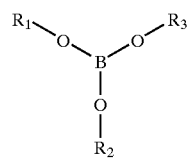

wherein $R_1$, $R_2$, and $R_3$ each, independently of the others, is an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from about 2 to about 30 carbon atoms, preferably with from about 2 to about 20 carbon atoms, and more preferably with from about 2 to about 12 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon atoms can be outside of these ranges, such as benzyl or the like, an alkylaryl group (including substituted alkylaryl groups), typically with from about 7 to about 30 carbon atoms, preferably with from about 7 to about 20 carbon atoms, and more preferably with from about 7 to about 14 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring, and wherein $R_1$, $R_2$, and/or $R_3$ can be joined together to form an aliphatic or aromatic ring, and those of the general formulae

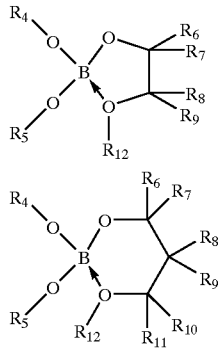 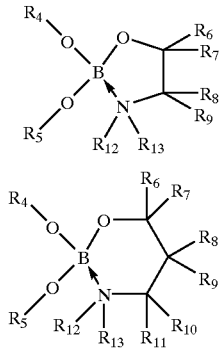

wherein $R_4$ and $R_5$ each, independently of the other, is an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 30 carbon atoms, preferably with from 1 to about 20 carbon atoms, and more preferably with from 1 to about 12 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon atoms can be outside of these ranges, such as benzyl or the like, an alkylaryl group (including substituted alkylaryl groups), typically with from about 7 to about 30 carbon atoms, preferably with from about 7 to about 20 carbon atoms, and more preferably with from about 7 to about 14 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, wherein $R_4$ and $R_5$ can be joined together to form a ring, $R_6$, $R_7$, $R_8$, $R_9$, $R_{10}$, and $R_{11}$ each, independently of the other, is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 30 carbon atoms, preferably with from 1 to about 20 carbon atoms, and more preferably with from 1 to about 12 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 14 carbon atoms, although the number of carbon a toms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon a toms can be outside of these ranges, such as benzyl or the like, an alkylaryl group (including substituted alkylaryl groups), typically with from about 7 to about 30 carbon atoms, preferably with from about 7 to about 20 carbon atoms, and more preferably with from about 7 to about 14 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, a hydroxy group, an amine group, an ammonium group, a cyano group, a pyridine group, a pyridinium group, an ether group, an aldehyde group, a ketone group, an ester group, an amide group, a carbonyl group, a sulfide group, a sulfoxide group, a phosphine group, a phosphonium group, a nitrile group, a mercapto group, a nitroso group, a halogen atom, a nitro group, a sulfone group, an acyl group, mixtures thereof, and the like, wherein one or more of $R_6$, $R_7$, $R_8$, $R_9$, $R_{10}$, and $R_{11}$ can be absent if a ring carbon atom has a double bond or a triple bond to another R group or to another ring carbon atom (for example, if $R_6$ is a=O carbonyl group, $R_7$ would be absent), and $R_{12}$ and $R_{13}$ each, independently of the other, is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 30 carbon atoms, preferably with from 1 to about 20 carbon atoms, and more preferably with from 1 to about 12 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon atoms can be outside of these ranges, such as benzyl or the like, an alkylaryl group (including substituted alkylaryl groups), typically with from about 7 to about 30 carbon atoms, preferably with from about 7 to about 20 carbon atoms, and more preferably with from about 7 to about 14 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, wherein $R_6$, $R_7$, $R_8$, $R_9$, $R_{10}$, $R_{11}$, $R_{12}$, and/or $R_{13}$ can be joined together to form a ring, and wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring.

Specific examples of suitable borate esters for the inks of the present invention include disorbitan borate, of the formula

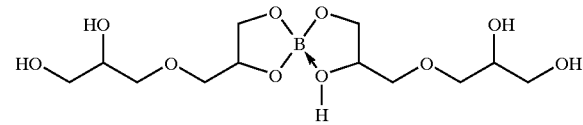

disorbitol borate, of the formula

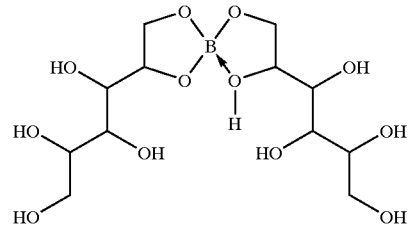

borate esters of glycerin monoethoxylate, of the formula

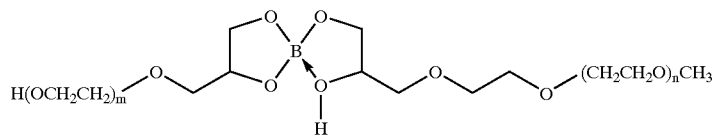

wherein m and n are integers representing the number of repeat —(OCH$_2$CH$_2$)— units, typically each being from about 2 to about 60, and preferably from about 2 to about 30, although the values of m and n can be outside of these ranges, diglycerol borate, of the formula

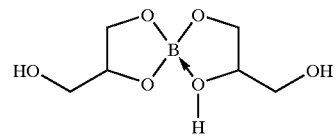

N,N-dibutylethanolamine glycerol borate, of the formula

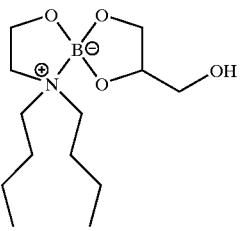

glycerol borate monoesters, of the formula

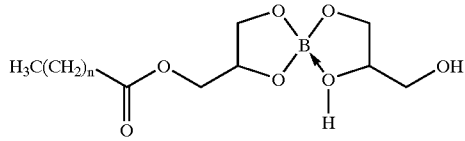

wherein n is an integer representing the number of repeat —CH$_2$— units, and typically is from 0 to about 30, and preferably from about 7 to about 21, although the value of n can be outside of these ranges, such as glycerol borate laurate wherein n is 10, sorbitol glycerol borate, of the formula

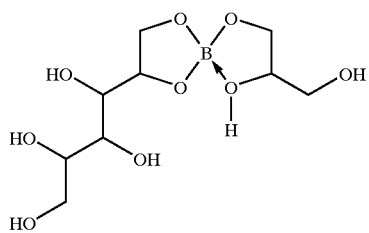

bis-neopentylglycol borate, of the formula

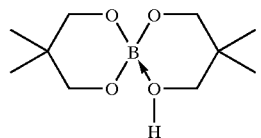

trimethylene borate (Aldrich Chemical 19,319-4), of the formula

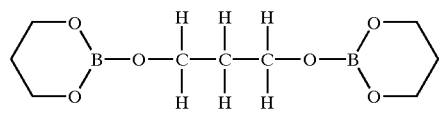

glycerol salicylamide borate, of the formula

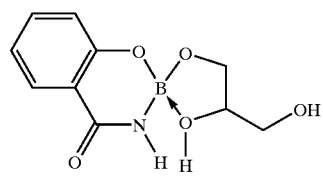

borate ester of polyethylene glycol methyl ether, of the formula

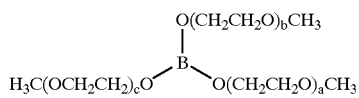

wherein a, b, and c are each integers representing the number of repeat ethylene oxide units, and a, b, and c each, independently of the others, typically is from about 3 to about 60, preferably from about 3 to about 30, and more preferably from about 3 to about 20, although the values of a, b, and c can be outside of these ranges, triethylene glycol monomethyl ether borate, of the formula

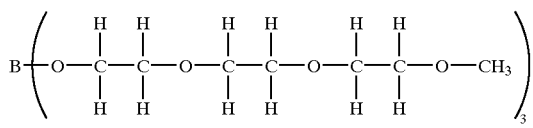

salicylamide borate, of the formula

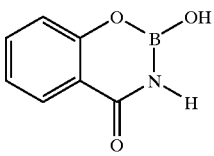

N,N-dibutylethanolamine sorbitol borate, of the formula

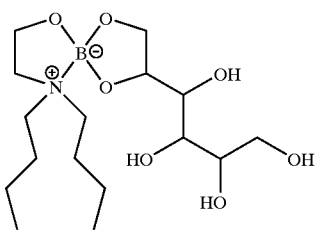

salicylamide sorbitol borate, of the formula

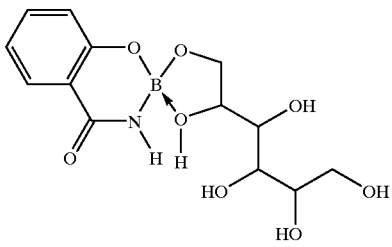

and the like, as well as mixtures thereof.

Other borate esters not within these formulae can also be employed.

In addition to monomeric borate esters, polymers and copolymers of borate esters can also be used in the inks of the present invention. Copolymers of borate esters can be prepared by any known or desired method, such as by known methods for forming polyesters. For example, a monomeric borate ester compound having two primary or secondary alcohol groups thereon can be condensed with a diacid, such as those of the general formula HOOC—R—COOH, wherein R is an alkylene group, typically with from about 8 to about 82 carbon atoms, although the number of carbon atoms can be outside of this range, to extrude water and form a copolymer, as follows:

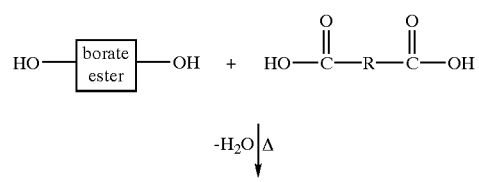

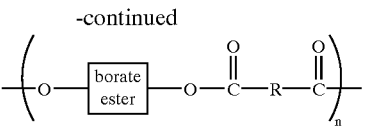

wherein n is an integer representing the number of repeat monomer units. Similarly, a borate ester having two acetyl groups thereon can be reacted with a diacid, such as those of the general formula HOOC—R—COOH, wherein R is an alkylene group, typically with from about 2 to about 22 carbon atoms, although the number of carbon atoms can be outside of this range, heating to extrude acetic acid and to form a copolymer, as follows:

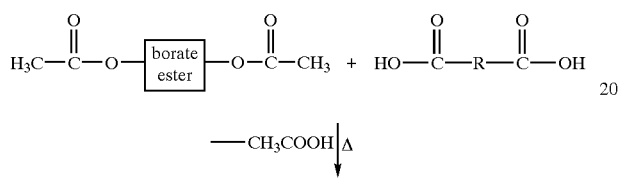

-continued

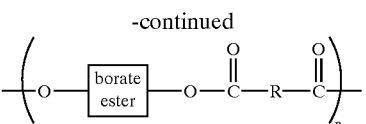

wherein n is an integer representing the number of repeat monomer units. Similarly, monomeric borate ester compound having two primary or secondary alcohol groups thereon can be reacted with a diester, such as those of the general formula H₃COOC—R—COOCH₃, wherein R is an alkylene group, typically with from about 2 to about 22 carbon atoms, although the number of carbon atoms can be outside of this range, heating to extrude methanol and to form a copolymer, as follows:

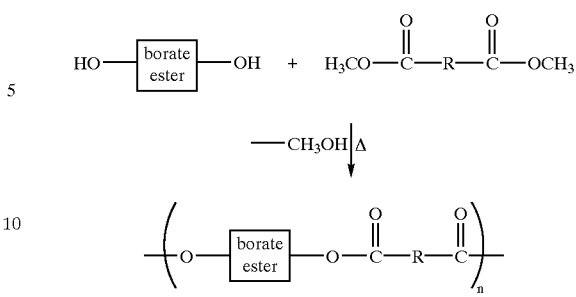

wherein n is an integer representing the number of repeat monomer units. In addition, a monomeric borate ester compound having two primary or secondary alcohol groups thereon can be reacted with a polyester to incorporate random monomer units of the borate ester into the polyester. For example, heating polyethylene terephthalate and diglycerol borate can result in the extrusion of ethylene glycol and formation of a random copolyester, as follows:

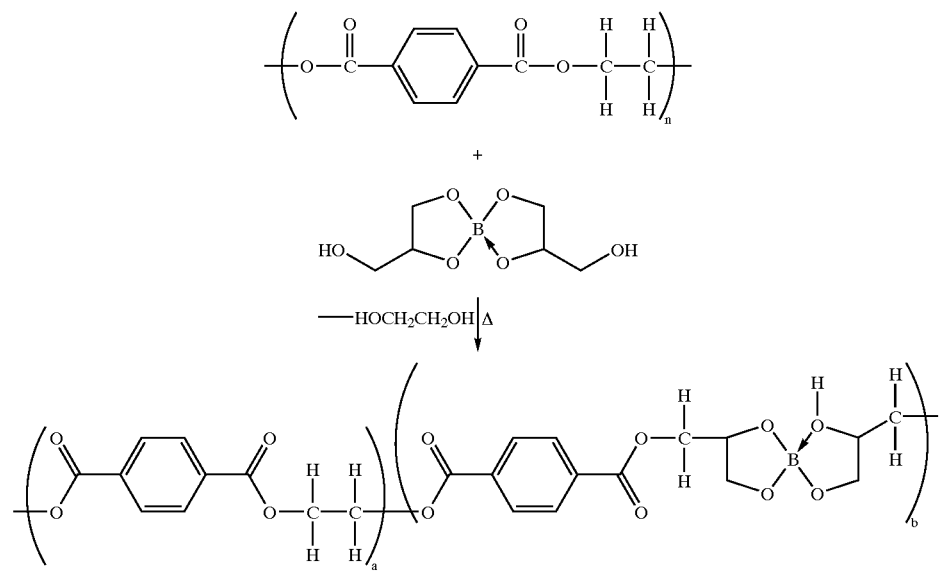

wherein a and b are integers representing the number of repeat monomer units. Polymeric borate esters are also disclosed in, for example, JP 11012524 A2, the disclosure of which is totally incorporated herein by reference. Borate ester compounds suitable for the inks of the present invention also include polymers having at least some repeat monomer units derived from monomeric borate esters.

Borate ester compounds suitable for the inks of the present invention are commercially available as, for example, MTG-100 and HOSTACOR BF, available from Clariant Corporation, Charlotte, N.C., HI BORON, available from Boron International Ltd., Tokyo, Japan, the EMULBON series, such as CAS number 83609-03-4 and CAS number 83619-51-6, and the like. These compounds can also be prepared by admixing boric acid with a primary or secondary alcohol or alkanolamine that will result in the desired ester compound in the presence of toluene and heating the mixture to azeotrope out water resulting from the reaction.

Examples of alcohols from which borate esters suitable for the inks of the present invention can be prepared include those of the general formula

R—OH wherein R is an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 30 carbon atoms, preferably with from 1 to about 20 carbon atoms, and more preferably with from 1 to about 12 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon atoms can be outside of these ranges, such as benzyl or the like, an alkylaryl group (including substituted alkylaryl groups), typically with from about 7 to about 30 carbon atoms, preferably with from about 7 to about 20 carbon atoms, and more preferably with from about 7 to about 14 carbon atoms, although the number of carbon atoms can be outside of these ranges, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, wherein the substituents on the substituted alkyl, aryl, arylalkyl, alkylaryl, alkoxy, and polyalkyleneoxy groups can be (but are not limited to) hydroxy groups, amine groups, pyridine groups, ether groups, ester groups, amide groups, carbonyl groups, mixtures thereof, and the like, wherein two or more substituents can be joined together to form a ring.

Examples of alcohols from which cyclic borate esters suitable for the inks of the present invention can be prepared include those of the general formulae

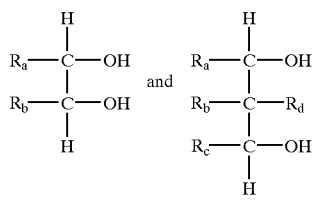

and examples of suitable alkanolamines from which cyclic borate esters suitable for the inks of the present invention can be prepared include those of the general formulae

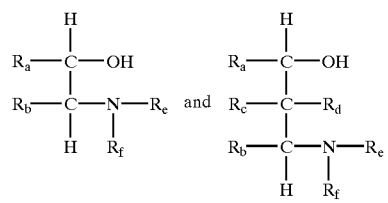

wherein $R_a$, $R_b$, $R_c$, $R_d$, $R_e$, and $R_f$ each, independently of the others, can be a hydrogen atom, an alkyl group (including linear, branched, saturated, unsaturated, cyclic, and substituted alkyl groups), typically with from 1 to about 30 carbon atoms, preferably with from 1 to about 20 carbon atoms, and more preferably with from 1 to about 12 carbon atoms, although the number of carbon atoms can be outside of these ranges, an aryl group (including substituted aryl groups), typically with from about 6 to about 30 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 30 carbon atoms, preferably with from about 7 to about 20 carbon atoms, and more preferably with from about 7 to about 14 carbon atoms, although the number of carbon atoms can be outside of these ranges, such as benzyl or the like, an alkoxy group (including substituted alkoxy groups, and wherein hetero atoms, such as oxygen, nitrogen, sulfur, silicon, phosphorus, and the like can be present in the alkoxy group), typically with from 1 to about 30 carbon atoms, preferably with from 1 to about 20 carbon atoms, and more preferably with from 1 to about 12 carbon atoms, although the number of carbon atoms can be outside of these ranges, a polyalkyleneoxy group (including substituted polyalkyleneoxy groups, and wherein hetero atoms, such as oxygen, nitrogen, sulfur, silicon, phosphorus, and the like can be present in the polyalkyleneoxy group), such as polyethyleneoxy groups, polypropyleneoxy groups, polybutyleneoxy groups, and the like, typically with from about 2 to about 60 repeat alkyleneoxy units, preferably with from about 2 to about 30 repeat alkyleneoxy units, and more preferably with from about 2 to about 20 repeat alkyleneoxy units, although the number of repeat alkyleneoxy units can be outside of these ranges, a hydroxy group, an amine group, an ammonium group, a cyano group, a pyridine group, a pyridinium group, an ether group, an aldehyde group, a ketone group, an ester group, an amide group, a carbonyl group, a sulfide group, a sulfoxide group, a phosphine group, a phosphonium group, a nitrile group, a mercapto group, a nitroso group, a halogen atom, a nitro group, a sulfone group, an acyl group, mixtures thereof, and the like, wherein $R_a$, $R_b$, $R_c$, $R_d$, $R_e$, and/or $R_f$ can be joined together to form a ring, and wherein the substituents on the substituted alkyl, aryl, arylalkyl, alkylaryl, alkoxy, and polyalkyleneoxy groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring. For example, when $R_a$, $R_b$, $R_c$, $R_d$, $R_e$, and/or $R_f$ are themselves ester groups or are substituted with ester groups, these groups can be of the formula

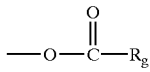

wherein $R_g$ is defined as $R_a$, through $R_f$ above. Examples of materials within these general formulae include

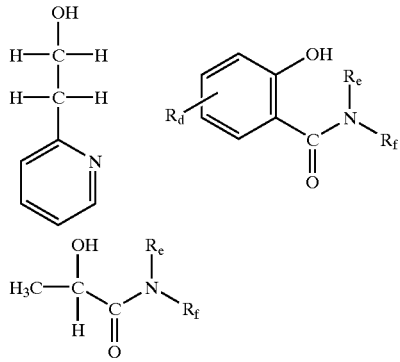

and the like.

Specific examples of suitable alcohols and alkanolamines include glycerol, sorbitol, sorbitan, xylitol, mannitol, glyceroloxyglycerol, 1,3-propanediol, triethylene glycol monomethyl ether, glycerin laurate, di-N-butylethanolamine, the Guerbet alcohols, and the like. Specific examples of suitable hydroxyamides include salicylamide, lactamide, and the like.

The borate ester is present in the ink in any desired or effective amount, typically at least about 20 percent by weight of the ink, preferably at least about 50 percent by weight of the ink, and more preferably at least about 70 percent by weight of the ink, and typically no more than about 99 percent by weight of the ink, preferably no more than about 95 percent by weight of the ink, and more preferably no more than about 90 percent by weight of the ink, although the amount can be outside of these ranges.

In some embodiments of the present invention, the borate ester functions as the sole ink vehicle for the hot melt ink composition. In other embodiments, if desired, other hot melt ink vehicles can be present in combination with the borate esters of the present invention. Mixtures of two or more borate esters can also be employed, either alone or in combination with other hot melt ink vehicle materials. When the borate ester is to be the primary ink vehicle material, borate esters such as diglycerol borate, glycerol sorbitol borate, glycerol borate laurate, and N,N-dibutylethanolamine glycerol borate are particularly suitable, although other borate esters can also be employed as primary ink vehicle materials. Borate esters that are liquid at about 20° C. can be employed in the inks of the present invention, provided that, in combination with the other ink ingredients, the resulting phase change ink is solid at temperatures of less than about 50° C.

Any desired or effective colorant can be employed in the inks of the present invention, including dyes, pigments, mixtures thereof, and the like, provided that the colorant can be dissolved or dispersed in the ink vehicle, with spirit soluble dyes being preferred. The colorant is present in the ink in any desired or effective amount to obtain the desired color and hue, typically no less than about 0.5 percent by weight of the ink, and preferably no less than about 1 percent by weight of the ink, and typically no more than about 15 percent by weight of the ink, preferably no more than about 10 percent by weight of the ink, and more preferably no more than about 5 percent by weight of the ink, although the amount can be outside of these ranges.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada): E. D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2GO1 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like, as well as mixtures thereof, Examples of suitable dyes include Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF) and the like, as well as mixtures thereof.

Mixtures of dyes and pigments can also be employed.

The inks of the present invention can optionally contain a conductivity enhancing agent when conductive inks are desirable, as in applications such as electric field assisted hot melt acoustic ink printing processes, particularly when the desired conductivity values are not obtained as a result of the other ink components, such as the colorant. Any desired or effective conductivity enhancing agent can be employed. Specific examples of suitable conductivity enhancing agents include complexes of dianilines, including dianiline and bis dianiline compounds, such as (1) 2,2'-dithio dianiline (Aldrich 16,676-6), (2) 4,4'-dithiodianiline (Aldrich 36,946-26), (3) 3,3'-methylene dianiline (Aldrich 37,826-7), (4) 4,4'-methylene dianiline (Aldrich 13,245-4), (5) N-methyl-4,4'-methylene dianiline (Aldrich 42,282-7), (6) 4,4'-methylene bis(2,6-diethyl aniline) (Aldrich 36,078-3), (7) 4,4'-methylene bis(2,6-diisopropyl-N,N-dimethylaniline) (Aldrich 40,353-9), (8) 4,4'-methylene bis (N,N-dimethylaniline) (Aldrich M4,445-1), (9) 4,4'-methylene bis (2,6-dimethylaniline) (Aldrich 36,079-1), (10) 4,4'-methylene bis (3-chloro-2,6-diethylaniline) (Aldrich 42,660-1), (11) 3,3'-(sulfonyl bis(4,1-phenylene))dianiline (Aldrich 44,095-7), (12) 4,4'-(1,3-phenylene diisopropylidene) bisaniline (Aldrich 45,048-0), and the like, as well as mixtures thereof, said dianilines being complexed with, for example, conductivity inducing phosphorous compounds such as phosphorus-containing acid compounds, with specific examples including (1) phenylphosphinic acid (Aldrich P2,880-8), (2) dimethylphosphinic acid (Aldrich 32,829-4), (3) methyl phosphonic acid (Aldrich 28,986-8), and the like, as well as mixtures thereof. Additional suitable conductivity enhancing agents include (1) (diethyl-(4-aminobenzyl) phosphonate (Aldrich 33,847-8), (2) diethyl-(phthalimidomethyl) phosphonate (Aldrich 36,622-6), (3) diethyl-(2,2,2-trifluoro-1-hydroxyethyl) phosphonate (Aldrich 43,982-7), (4) diphenyl succinimidyl phosphate (Aldrich 45,061-8), (5) dihexadecyl phosphate (Aldrich 27,149-7), (6) undecylenic acid zinc salt (hardness value 68; Aldrich 32,958-4), (7) zinc bis(2,2,6,6-tetramethyl-3,5-heptanedionate) (Aldrich 41,773-4), (8) zinc cyclohexanebutyrate (Aldrich 22,841-9), (9) zinc stearate (Aldrich 30,756-4), (10) methyl-l-adamantane sulfonate (Aldrich 40,956-1), (11) octadecyl-4-chlorobenzene sulfonate (Aldrich 47,799-0), (12) tetrabutylammonium trifluoromethanesulfonate (Aldrich 34,509-1), (13) S,S'-ethylene-ρ-toluene thiosulfonate (Aldrich 23,257-2), (14) pyridinium-3-nitrobenzene sulfonate (Aldrich 27,198-5), (15) ρ-toluene sulfonyl chloride (Aldrich 24,087-7), (16) o-toluene sulfonyl chloride (Aldrich 15,971-9), (17) 1-(ρ-toluene sulfonyl) imidazole (Aldrich 24,424-4), (18) 1-(ρ-toluene sulfonyl)-3-nitro-1,2,4-triazole (Aldrich 24,417-1), (19) 2,4,6-triisopropyl benzene sulfonyl chloride (Aldrich 11,949-0), (20) 1-(2,4,6-triisopropyl benzene sulfonyl) imidazole (Aldrich 40,948-0), (21) 1-(2,4,6-triisopropyl benzene sulfonyl)-3-nitro-1,2,4-triazole (Aldrich 40,948-0), (22) 4-nitrobenzene sulfonyl chloride (Aldrich 27,224-8), and the like, as well as mixtures thereof. The conductivity enhancing agent, when present, is present in the ink in any desired or effective amount, typically at least about 0.25 percent by weight of the ink, preferably at least about 0.5 percent by weight of the ink, more preferably at least about 2 percent by weight of the ink, even more preferably at least about 8 percent by weight of the ink, and still more preferably at least about 13 percent by weight, and typically no more than about 50 percent by weight of the ink, preferably no more than about 45 percent by weight of the ink, more preferably no more than about 35 percent by weight of the ink, even more preferably no more than about 25 percent by weight of the ink, and still more preferably no more than about 20 percent by weight of the ink, although the amount can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include (but are not limited to) (1) 2,6-di-tert-butyl-4-methoxyphenol (Aldrich 25,106-2), (2) 2,4-di-tert-butyl-6-(4-methoxybenzyl) phenol (Aldrich 23,008-1), (3) 4-bromo-2,6-dimethylphenol (Aldrich 34,951-8), (4) 4-bromo-3,5-didimethylphenol (Aldrich B6,420-2), (5) 4-bromo-2-nitrophenol (Aldrich 30,987-7), (6) 4-(diethyl aminomethyl)-2,5-dimethylphenol (Aldrich 14,668-4), (7) 3-dimethylaminophenol (Aldrich D14,400-2), (8) 2-amino-4-tert-amylphenol (Aldrich 41,258-9), (9) 2,6-bis(hydroxymethyl)-ρ-cresol (Aldrich 22,752-8), (10) 2,2'-methylenediphenol (Aldrich B4,680-8), (11) 5-diethylamino)-2-nitrosophenol (Aldrich 26,951-4), (12) antimony dialkyl phosphorodithioate (commercially available from Vanderbilt), (13) molybdenum oxysulfide dithiocarbamate (commercially available from Vanderbilt), (14) (nickel-bis(o-ethyl(3,5-di-tert-butyl-4-hydroxybenzyl) phosphonate (commercially available from Ciba Geigy), (15) 4,4'-methylene-bis(dibutyldithiocarbamate) (commercially available as Vanlube 7723 from Vanderbilt), (16) tetrasodium-N-(1,2-dicarboxyethyl)-N-octadecyl sulfosuccinamate (commercially available from American Cyanamid), (17) 2,6-di-tert-butyl-α-dimethylamino-4-cresol (commercially available as Ethanox-703 from Ethyl Corporation), (18) 2,2'-isobutylidene-bis(4,6-dimethyl phenol) (commercially available as Vulkanox NKF from Mobay Chemicals), (19) 2,2'-methylenebis(6-tert-butyl-4-methylphenol) (commercially available as Cyanox-2246, Aldrich 41,315-5), (20) 2,2'-methylenebis(6-tert-butyl-4-ethylphenol) (commercially available as Cyanox-425, Aldrich 41,314-3), (21) N-isopropyl-N'-phenyl-phenylene diamine (commercially available as Santoflex-IP from Monsanto Chemicals), (22) N-(1,3-dimethylbutyl)-N'-phenyl-phenylene-diamine (commercially available as Santoflex-13 from Monsanto Chemicals), (23) N,N'-di(2-octyl)-4-phenylene diamine (commercially available as Antozite-1 from Vanderbilt), (24) N,N'-bis(1,4-dimethylpentyl)-4-phenylene diamine (commercially available as Santoflex-77 from Monsanto Chemicals), (25) 2,4,6-tris-(N-1,4-dimethyl pentyl-4-phenylenediamino)-1,3,5-triazine (commercially available as Durazone-37 from Uniroyal), (26) D-raffinose pentahydrate (Aldrich 20,667-9), (27) 2,2'-methylene bis(6-tert-butyl-4-methyl-phenol) (Aldrich 41,313-5), (28) 2,6-di-tert-butyl-4-(dimethylaminomethyl) phenol (Aldrich 41,327-5), (29) 4-dodecylresorcinol (Aldrich D22,260-7), (30) Irganox 1010, and the like, as well as mixtures thereof. When present, the optional antioxidants are present in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

The inks of the present invention can also optionally contain a UV absorber. The optional UV absorbers in the inks of the present invention primarily protect the images generated therewith from UV degradation. Specific examples of suitable UV absorbers include (but are not limited to) (1) 2-amino-2',5-dichlorobenzophenone (Aldrich 10,515-5), (2) 2'amino-4',5'-dimethoxyacetophenone (Aldrich 32,922-3), (3) 2-benzyl-2-(dimethylamino)-4'-morpholino butyrophenone (Aldrich 40,564-7), (4) 4'-benzyloxy-2'-hydroxy-3'-methylacetophenone (Aldrich 29,884-0), (5) 4,4'-bis(diethylamino) benzophenone (Aldrich 16,032-6), (6) 5-chloro-2-hydroxy benzophenone (Aldrich C4,470-2), (7) 4'-piperazinoacetophenone (Aldrich 13,646-8), (8) 4'-piperidinoacetophenone (Aldrich 11,972-

5), (9) 2-amino-5-chlorobenzophenone (Aldrich A4,556-4), (10) 2-bromo-2',4-dimethoxyacetophenone (Aldrich 19,948-6), (11) 2-bromo-2',5'-dimethoxyacetophenone (Aldrich 10,458-2), (12) 2-bromo-3'-nitroacetophenone (Aldrich 34,421-4), (13) 2-bromo-4'-nitroacetophenone (Aldrich 24,561-5), (14) 3',5'-diacetoxyacetophenone (Aldrich 11,738-2, (15) 2-phenylsulfonyl) acetophenone (Aldrich 34,150-3), (16) 3'-aminoacetophenone (Aldrich 13,935-1), (17) 4'-aminoacetophenone (Aldrich A3,800-2), (18) 1H-benzotriazole-1-acetonitrile (Aldrich 46,752-9), (19) 2-(2H-benzotriazol-2-yl)-4,6-di-tert-pentylphenol (Aldrich 42,274-6), (20) 1,1-(1,2-ethane-diyl)bis(3,3,5,5-tetramethylpiperazinone) (commercially available from Goodrich Chemicals), (21) 2,2,4-trimethyl-1,2-hydroquinoline (commercially available from Mobay Chemical), (22) 2-(4-benzoyl-3-hydroxy phenoxy) ethylacrylate, (23) 2-dodecyl-N-(1,2,2,6,6-pentamethyl-4-piperidinyl) succinimide (commercially available from Aldrich Chemical Co., Milwaukee, Wis.), (24) 2,2,6,6-tetramethyl-4-piperidinyl/β,β,β',β'-tetramethyl-3,9-(2,4,8,10-tetraoxo spiro(5,5)-undecane) diethyl)-1,2,3,4-butane tetracarboxylate (commercially available from Fairmount), (25) N-ρ-ethoxycarbonylphenyl)-N'-ethyl-N'-phenylformadine (commercially available from Givaudan), (26) 6-ethoxy-1,2-dihydro-2,2,4-trimethylquinoline (commercially available from Monsanto Chemicals), (27) 2,4,6-tris-(N-1,4-dimethylpentyl-4-phenylenediamino)-1,3,5-triazine (commercially available from Uniroyal), (28) 2-dodecyl-N-(2,2,6,6-tetramethyl-4-piperidinyl) succinimide (commercially available from Aldrich Chemical Co.), (29) N-(1-acetyl-2,2,6,6-tetramethyl-4-piperidinyl)-2-dodecyl succinimide (commercially available from Aldrich Chemical Co.), (30) (1,2,2,6,6-pentamethyl-4-piperidinylβ, β,β',β'-tetramethyl-3,9-(2,4,8,10-tetraoxo-spiro-(5,5) undecane)diethyl)-1,2,3,4-butane tetracarboxylate (commercially available from Fairmount), (31) (2,2,6,6-tetramethyl-4-piperidinyl)-1,2,3,4-butane tetracarboxylate (commercially available from Fairmount), (32) nickel dibutyl dithio carbamate (commercially available as UV-Chek AM-105 from Ferro), and the like, as well as mixtures thereof. The optional UV absorber, when present, is present in the ink in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

Other optional additives to the inks include tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300 and NEVTAC® 80 (commercially available from Neville Chemical Company), WINGTACK® 86, a modified synthetic polyterpene resin (commercially available from Goodyear), and the like, in an amount typically of at least about 1 percent by weight of the ink, and preferably at least about 3 percent by weight of the ink, and typically no more than about 40 percent by weight of the ink, preferably no more than about 20 percent by weight of the ink, and more preferably no more than about 10 percent by weight of the ink, although the amount can be outside of this range, adhesives, such as VERSAMID® 757, 759, or 744 (commercially available from Henkel), in an amount typically of at least about 0.5 percent by weight of the ink, preferably at least about 5 percent by weight of the ink, and more preferably at least about 10 percent by weight of the ink, and typically no more than about 50 percent by weight of the ink, preferably no more than about 40 percent by weight of the ink, and more preferably no more than about 20 percent by weight of the ink, although the amount can be outside of this range, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), KP-140®, a triphenyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount typically of at least about 0.5 and typically no more than about 20 percent by weight of the ink, and preferably no more than about 10 percent by weight of the ink, although the amount can be outside of this range, and the like.

The ink compositions of the present invention typically are solid at temperatures of about 50° C. and lower, preferably solid at temperatures of about 70° C. and lower, and more preferably solid at temperatures of about 80° C. and lower, and typically have viscosity values of from about 5 to 30 centipoise at temperatures no higher than about 160° C., preferably no higher than about 140° C., and more preferably no higher than about 120° C., although the temperature at which these viscosities are achieved can be outside of these ranges.

Inks of the present invention are generally amorphous, and without sharp crystalline melting points. Suitable solid inks for the purposes of the present invention typically have a viscosity of 10 poise or more at about 20° C., there is no upper limit on the viscosity at about 20° C.

The ink compositions of the present invention generally have viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges.

The viscosity of the phase change inks of the present invention can be adjusted by addition of ink additives such as pigments, other borate esters, other ink vehicle materials, diluents, other optional ink ingredients, and the like. Both solid and liquid additives can be employed provided that the resulting ink is solid at temperatures of less than about 50° C. During the process of making some borate esters, a mixture of a monoborate and a diborate can be formed; in these instances, the presence of the diborate can increase the viscosity of the borate ester composition. Monomeric borate esters are typically formed from the reaction of boric acid with monofunctional alcohols, and these borate esters are usually liquid at ambient temperature unless solidification is induced by crystallization of a long hydrocarbon or alkylene oxide segment on the monofunctional alcohol. Cyclic borate esters are typically formed when a 1,2- or 1,3-diol, aminoalcohol, or hydroxyamide is reacted with boric acid. If these 1,2- or 1,3- molecules have additional hydroxyl, amino, or amide substituents, the possibility exists for bridging of borate esters, which results in an increase viscosity of the composition.

The ink compositions of the present invention can be prepared by any desired or suitable method. For example, the ink ingredients can be mixed together, followed by heating, typically to a temperature of from about 100 to about 140° C., although the temperature can be outside of this range, and stirring or milling until a homogeneous ink composition is obtained, followed by cooling the ink to ambient temperature (typically from about 20 to about 25° C.). The inks of the present invention are solid at ambient temperature.

The present invention is also directed to a process which entails incorporating an ink of the present invention into an ink jet printing apparatus, melting the ink, and causing droplets of the melted ink to be ejected in an imagewise pattern onto a substrate. By "substrate" is meant either a final recording sheet, such as paper, transparency material, and the like, or one or more intermediate transfer members onto which the inks are first applied, followed by transferring the inks to a final recording sheet. In one specific embodiment, the printing apparatus employs a piezoelectric printing process wherein droplets of the ink are caused to be ejected in imagewise pattern by oscillations of piezoelectric vibrating elements. In another specific embodiment, the printing apparatus employs an acoustic ink jet process, wherein droplets of the ink are caused to be ejected in imagewise pattern by acoustic beams. In another specific embodiment, the droplets of melted ink are caused to be ejected onto an intermediate transfer member, followed by transfer of the image from the intermediate transfer member to a recording sheet. In a specific embodiment, the intermediate transfer member is heated to a temperature above that of the final recording sheet and below that of the melted ink in the printing apparatus. Inks of the present invention can also be employed in other hot melt printing processes, such as hot melt thermal ink jet printing, hot melt continuous stream or deflection ink jet printing, or the like.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

Synthesis of Borate Esters

All of the borate esters were synthesized by simple esterification reactions between a specific alcohol or polyol and boric acid in toluene. No catalyst was added, and toluene was used to remove water continuously from the reaction by azeotropic distillation.

EXAMPLE I

N,N-dibutylethanolamine/glycerol borate was prepared as follows. Boric acid (10.3 grams), glycerol (15.3 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a brownish viscous liquid product (~45 grams) of N,N-dibutylethanolamine/glycerol borate was obtained.

EXAMPLE II

N,N-dibutylethanolamine/sorbitol borate was prepared as follows. Boric acid (10.3 grams), sorbitol (30.4 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a yellowish resinous product (~60 grams) of N,N-dibutylethanolamine/sorbitol borate was obtained.

EXAMPLE III

Salicylamide/glycerol borate was prepared as follows. Boric acid (10.3 grams), glycerol (15.3 grams), and salicylamide (22.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a yellowish resinous product (~40 grams) of salicylamide/glycerol borate was obtained.

EXAMPLE IV

Salicylamide/sorbitol borate was prepared as follows. Boric acid (10.3 grams), sorbitol (30.4 grams), and salicylamide (22.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a yellowish resinous product (~55 grams) of salicylamide/sorbitol borate was obtained.

EXAMPLE V

N,N-dibutylethanolamine/triethylene glycol monobutyl ether borate was prepared as follows. Boric acid (10.3 grams), triethylene glycol monobutyl ether (Fluka, 64.1 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a brownish liquid product (~90 grams) of N,N-dibutylethanolamine/triethylene glycol monobutyl ether borate was obtained.

EXAMPLE VI

N, N-dibutylethanolamine/poly(propylene glycol) monobutyl ether borate was prepared as follows. Boric acid (10.3 grams), poly(propylene glycol) monobutyl ether (Aldrich, average $M_n$=340, 113.3 grams), and N,N-dibutylethanolamine (28.9 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a brownish liquid product (~140 grams) of N,N-dibutylethanolamine/poly(propylene glycol) monobutyl ether borate was obtained.

EXAMPLE VII

Diglycerol borate, of the formula

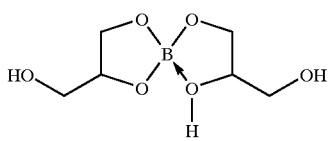

was prepared as follows. Boric acid (10.3 grams) and glycerol (30.6 grams) were added to a 250 milliliter flask. One hundred fifty milliliters of toluene was then added. The reaction was allowed to proceed overnight at 110° C., and the byproduct water (~9 grams) was continuously removed from the reaction by azeotropic distillation. The final solution was evaporated to remove toluene under vacuum, and a viscous liquid product (~30 grams) of diglycerol borate was obtained.

EXAMPLE VIII

Glycerol borate laurate, of the formula

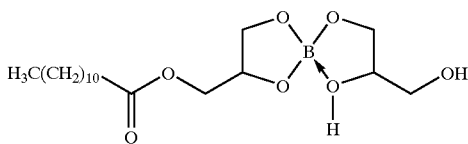

is prepared as follows. Boric acid (10.3 grams), glycerol (15.3 grams), and

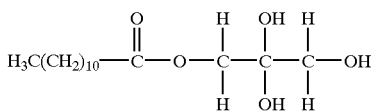

(48.322 grams) are added to a 250 milliliter flask. One hundred fifty milliliters of toluene is then added. The reaction is allowed to proceed overnight at 110° C., and the byproduct water (~9 grams) is continuously removed from the reaction by azeotropic distillation. The final solution is evaporated to remove toluene under vacuum, and a glycerol borate laurate product is obtained.

EXAMPLE IX

Sorbitan glycerol borate is prepared as follows. Boric acid (10.3 grams), glycerol (15.3 grams), and sorbitan (27.3 grams) are added to a 250 milliliter flask. One hundred fifty milliliters of toluene is then added. The reaction is allowed to proceed overnight at 110° C., and the byproduct water (~9 grams) is continuously removed from the reaction by azeotropic distillation. The final solution is evaporated to remove toluene under vacuum, and a sorbitan glycerol borate product is obtained.

EXAMPLE X

An ink composition is prepared by heating and admixing 80 parts by weight of diglycerol borate, 14.75 parts by weight of KEMAMIDE® S-180, 0.25 part by weight of IRGANOX® 1010, and 5 parts by weight of DUASYN® BLACK A-RG VP 280 dye, followed by stirring and subsequent cooling of the mixture to obtain a black ink.

EXAMPLE XI

An ink composition is prepared by heating and admixing 75 parts by weight of sorbitan glycerol borate, 14.75 parts by weight of KEMAMIDE® S-180, 0.25 part by weight of IRGANOX® 1010, 5 parts by weight of SAVINYL® BLACK RLSN dye, and 5 parts by weight of 1,3-dimethyl-1,2-imidazolidinone, followed by stirring and subsequent cooling of the mixture to obtain a black ink.

EXAMPLE XII

An ink composition is prepared by heating and admixing 80 parts by weight of diglycerol borate, 17.65 parts by weight of KEMAMIDE® S-180, 0.25 part by weight of IRGANOX® 1010, and 2.1 parts by weight of TRICON® 21042 magenta dye, followed by stirring and subsequent cooling of the mixture to obtain a magenta ink.

EXAMPLE XIII

An ink composition is prepared by heating and admixing 95 parts by weight of diglycerol borate, 2 parts by weight of IRGANOX® 1010, and 3 parts by weight of SUDAN YELLOW 146 dye (C.I. #12700; available from BASF), followed by stirring and subsequent cooling of the mixture to obtain a yellow ink.

EXAMPLE XIV

An ink composition is prepared by heating and admixing 95 parts by weight of glycerol borate laurate, 2 parts by weight of IRGANOX® 1010, and 3 parts by weight of SUDAN BLUE 670 dye (C.I. #61554; available from BASF), followed by stirring and subsequent cooling of the mixture to obtain a blue ink.

EXAMPLE XV

An ink composition is prepared by heating and admixing 75 parts by weight of sorbitan glycerol borate, 20 parts by weight of 2-(dibutylamino)ethanol/glycerol borate, 2 parts by weight of IRGANOX® 1010, and 3 parts by weight of SUDAN RED 462 dye (C.I. #26050; available from BASF), followed by stirring and subsequent cooling of the mixture to obtain a magenta ink.

EXAMPLE XVI

An ink composition is prepared by heating and admixing 15 parts by weight of a polyester derived from diglycerine borate and sebacic acid, 80 parts by weight of diglycerol borate, 2 parts by weight of IRGANOX® 1010, and 3 parts by weight of NEOZAPON BLACK X51 dye (C.I. Solvent Black; C.I. 12195; available from BASF), followed by stirring and subsequent cooling of the mixture to obtain a black ink.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a colorant and an ink vehicle, said ink being a solid at temperatures less than about 50° C., wherein the ink vehicle comprises a borate ester.

2. An ink according to claim 1 wherein the borate ester is monomeric.

3. An ink according to claim 1 wherein the borate ester is a polymer having at least some repeat monomer units derived from one or more monomeric borate esters.

4. An ink according to claim 1 wherein the borate ester is of the general formula

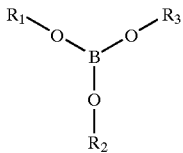

wherein $R_1$, $R_2$, and $R_3$ each, independently of the others, is an alkyl group, an aryl group, an arylalkyl group, an alkylaryl group, an alkoxy group, or a polyalkyleneoxy group.

5. An ink according to claim 1 wherein the borate ester is one of the general formulae

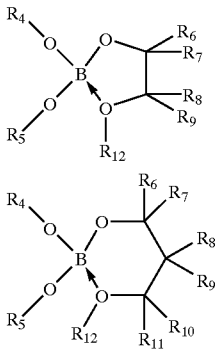 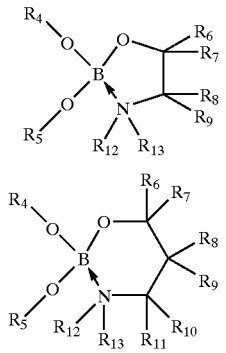

wherein $R_4$ and $R_5$ each, independently of the other, is an alkyl group, an aryl group, an arylalkyl group, an alkylaryl group, an alkoxy group, a polyalkyleneoxy group, wherein $R_4$ and $R_5$ can be joined together to form a ring, $R_6$, $R_7$, $R_8$, $R_9$, $R_{10}$, and $R_{11}$ each, independently of the other, is a hydrogen atom, an alkyl group, an aryl group, an arylalkyl group, an alkylaryl group, an alkoxy group, a polyalkyleneoxy group, a hydroxy group, an amine group, an ammonium group, a cyano group, a pyridine group, a pyridinium group, an ether group, an aldehyde group, a ketone group, an ester group, an amide group, a carbonyl group, a sulfide group, a sulfoxide group, a phosphine group, a phosphonium group, a nitrile group, a mercapto group, a nitroso group, a halogen atom, a nitro group, a sulfone group, or an acyl group, wherein one or more of $R_6$, $R_7$, $R_8$, $R_9$, $R_{10}$, and $R_{11}$ can be absent if a ring carbon atom has a double bond or a triple bond to another R group or to another ring carbon atom, and $R_{12}$ and $R_{13}$ each, independently of the other, is a hydrogen atom, an alkyl group, an aryl group, an arylalkyl group, an alkylaryl group, an alkoxy group, or a polyalkyleneoxy group, wherein $R_6$, $R_7$, $R_8$, $R_9$, $R_{10}$, $R_{11}$, $R_{12}$, and/or $R_{13}$ can be joined together to form a ring.

6. An ink according to claim 1 wherein the borate ester is disorbitan borate, disorbitol borate, a borate ester of glycerin monoethoxylate, diglycerol borate, N,N-dibutylethanolamine glycerol borate, a glycerol borate monoester, sorbitol glycerol borate, bis-neopentylglycol borate, trimethylene borate, glycerol salicylamide borate, a borate ester of polyethylene glycol methyl ether, triethylene glycol monomethyl ether borate, salicylamide borate, N,N-dibutylethanolamine sorbitol borate, salicylamide sorbitol borate, N,N-dibutylethanolamine/triethylene glycol monobutyl ether borate, N,N-dibutylethanolamine/poly (propylene glycol) monobutyl ether borate, glycerol borate laurate, sorbitan glycerol borate, or a mixture thereof.

7. An ink according to claim 1 wherein the borate ester is present in the ink in an amount of at least about 20 percent by weight of the ink.

8. An ink according to claim 1 wherein the borate ester is present in the ink in an amount of at least about 50 percent by weight of the ink.

9. An ink according to claim 1 wherein the borate ester is present in the ink in an amount of at least about 70 percent by weight of the ink.

10. An ink according to claim 1 wherein the colorant is present in the ink in an amount of at least about 0.5 percent by weight of the ink.

11. An ink according to claim 1 wherein the ink is solid at temperatures of about 70° C. and lower.

12. An ink according to claim 1 wherein the ink is solid at temperatures of about 80° C. and lower.

13. A process which comprises incorporating into an ink jet printing apparatus a phase change ink composition comprising a colorant and an ink vehicle, said ink being a solid at temperatures less than about 50° C., wherein the ink vehicle comprises a borate ester, melting the ink, and causing droplets of the melted ink to be ejected in an imagewise pattern onto a substrate.

14. A process according to claim 13 wherein the printing apparatus employs a piezoelectric printing process wherein droplets of the ink are caused to be ejected in imagewise pattern by oscillations of piezoelectric vibrating elements.

15. A process according to claim 13 wherein the ink has a viscosity of no more than about 30 centipoise at jetting temperatures.

16. A process according to claim 13 wherein the ink has a viscosity of no more than about 20 centipoise at jetting temperatures.

17. A process according to claim 13 wherein the ink has a viscosity of no more than about 15 centipoise at jetting temperatures.

18. A process according to claim 13 wherein the substrate is a final recording sheet and droplets of the melted ink are ejected in an imagewise pattern directly onto the final recording sheet.

19. A process according to claim 13 wherein the substrate is an intermediate transfer member and droplets of the melted ink are ejected in an imagewise pattern onto the intermediate transfer member followed by transfer of the imagewise pattern from the intermediate transfer member to a final recording sheet.

20. A process according to claim 19 wherein the intermediate transfer member is heated to a temperature above that of the final recording sheet and below that of the melted ink in the printing apparatus.

* * * * *